United States Patent

[11] 3,629,085

| [72] | Inventor | Guillaume Coppens |
| | | Brussels, Belgium |
| [21] | Appl. No. | 783,595 |
| [22] | Filed | Dec. 13, 1968 |
| [45] | Patented | Dec. 21, 1971 |
| [73] | Assignee | Solvay & Cie. |
| | | Brussels, Belgium |
| [32] | Priority | Dec. 19, 1967 |
| [33] | | Belgium |
| [31] | | 52302 |

[54] PHOTOCHEMICAL PURIFICATION OF 1,2-DICHLORETHANE
10 Claims, 1 Drawing Fig.

[52] U.S. Cl. .................................................. 204/163 R
[51] Int. Cl. .................................................. B01j 1/10
[50] Field of Search ........................................... 204/163

[56] References Cited
UNITED STATES PATENTS

| 3,474,018 | 10/1969 | Groeb et al. ............... | 204/163 R |
| 3,505,193 | 4/1970 | Mottern et al. ............ | 204/163 R |
| 3,506,552 | 4/1970 | Russell ..................... | 204/163 R |

FOREIGN PATENTS

| 996,306 | 6/1965 | Great Britain ............. | 204/163 |

*Primary Examiner*—Benjamin R. Padgett
*Attorney*—Spencer and Kaye

ABSTRACT: Trichlorethylene, a contaminant of 1,2-dichlorethane, is removed from the latter so that higher rates of conversion to vinyl chloride can be effected.

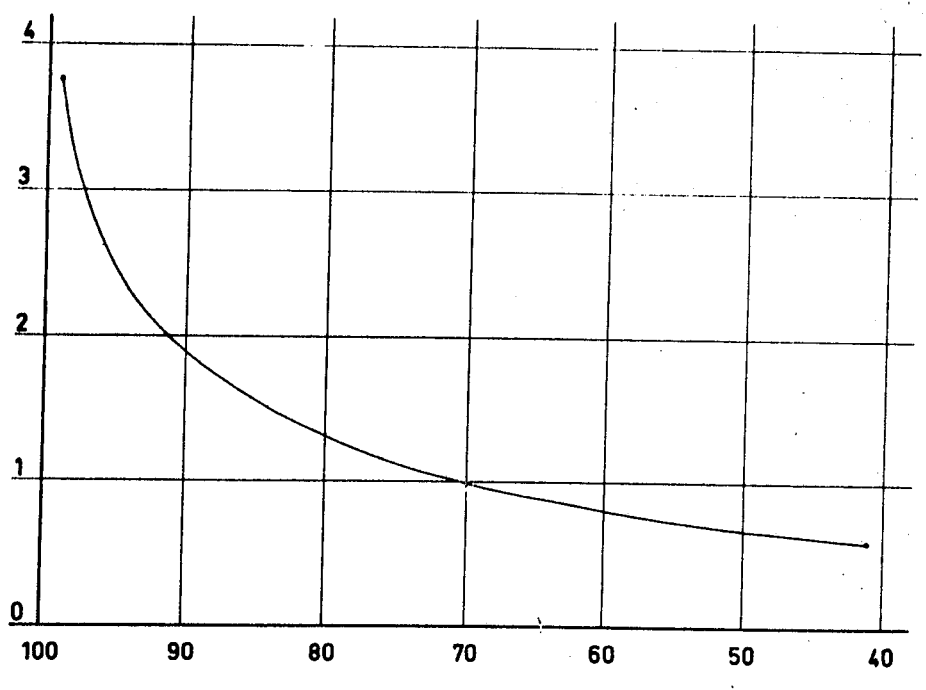

3,629,085

PHOTOCHEMICAL PURIFICATION OF 1,2-DICHLORETHANE

BACKGROUND OF THE INVENTION

When 1,2-dichlorethane is prepared conventionally, it contains variable quantities of trichlorethylene as a byproduct. The byproduct, even in concentrations in the order of only 1 percent by weight, can cause a substantial reduction in the rate of conversion of 1,2-dichlorethane to vinyl chloride when such conversion is effected by a classical method, e.g., thermal dehydrochlorination or pyrolysis.

Two successive distillations are ordinarily employed to remove impurities from 1,2-dichlorethane. The first distillation eliminates light contaminants, such as ethyl chloride; the second, heavy contaminants, such as higher chlorethanes. Notwithstanding such purification, however, the concentration of trichlorethylene in thus-distilled 1,2-dichlorethane progressively increases in proportion with, e.g., recycling the latter to the action of pyrolysis in the preparation of vinyl chloride therefrom; the trichlorethylene is not transformed.

The physical separation of trichlorethylene from 1,2-dichlorethane by distillation is difficult since the two compounds form an azeotrope at 82.2° C., and pure 1,2-dichlorethane boils at 83.6° C. Separation can be effected by reacting the trichlorethylene with chlorine to form pentachlorethane, which is readily separated from 1,2-dichlorethane by distillation. This is accomplished, according to French Pat. No. 1,466,058, by treating trichlorethylene-contaminated 1,2-dichlorethane with chlorine under essentially anhydrous conditions in the presence of ferric chloride, as catalyst; separation of the thus-produced pentachlorethane leaves 12,-dichlorethane with a sufficiently low, less than 0.1 percent by weight, concentration of trichlorethylene that the rate of conversion of said 1,2-dichloroethane to vinyl chloride is not substantially disturbed.

The process suggested by said French patent has serious drawbacks. The ferric chloride catalyst remains in the 1,2-dichlorethane and must be separated therefrom to prevent rapid clogging of the distillation column employed to obtain 1,2-dichlorethane free of higher boiling compounds, such as tri- or pentachlorethanes. Also, the catalyzed reaction requires rigorously anhydrous conditions to retain the activity of the ferric chloride; even with such conditions the chlorination is exceedingly slow, reaction times in excess of 8 hours being required.

SUMMARY OF THE INVENTION

An object of the invention is to purify 1,2-dichlorethane by removing trichlorethylene therefrom.

Another object is to remove the trichlorethylene in a manner which does not require anhydrous conditions.

A further object is to obtain thus-purified 1,2-dichlorethane without further contaminating same with a chemical catalyst which must be subsequently removed therefrom.

A still further object is to use actinic light to convert trichlorethylene to pentachlorethane.

Briefly, according to the invention trichlorethylene is removed from 1,2-dichlorethane, particularly that intended for use in the manufacture of vinyl chloride. The trichlorethylene is converted to pentachlorethane in the presence or absence of water by treatment of trichlorethylene-contaminated 1,2-dichlorethane with chlorine in the presence of actinic light. The difficulties encountered by the process of the French patent are avoided.

BRIEF DESCRIPTION OF THE DRAWING

The sole FIGURE is a diagram showing a comparison of the relative percentages of trichlorethylene and dichlorethane transformed to their respective chlorination products.

DESCRIPTION OF THE PREFERRED EMBODIMENTS

Trichlorethylene is chlorinated in solution in 1,2-dichlorethane simply by initiating the reaction by exposure to light. Although any ultraviolet lamp of a type normally employed in photochemistry and producing light having a wavelength of from 2,000 to 4,000 angstroms (A.) can be used for this purpose, good results are obtainable in the presence of daylight. The duration of the reaction is essentially related to the efficiency of the light emitter. With a suitable ultraviolet lamp said reaction is effected in less than 30 minutes; under the least favorable conditions, i.e., in the presence of daylight, at most from 1 to 2 hours may be required.

The chlorination can be carried out under anhydrous conditions, but such conditions are not required. The presence of water in the 1,2-dichlorethane has no influence on said chlorination. Trichlorethylene contaminating the 1,2-dichlorethane is transformed in the same manner to pentachlorethane (b.p. 162° C.) whether said 1,2-dichlorethane is dry or saturated with water. The resulting pentachlorethane is conventionally separated from 1,2-dichlorethane, e.g., by distillation.

Although trichlorethylene and 1,2-dichlorethane follow the same type of chlorination mechanism, the speed of chlorination of trichlorethylene is about 120 times more rapid than that of 1,2-dichlorethane. Under given conditions, therefore, the molar proportion of 1,2-dichlorethane chlorinated into 1,1,2-trichlorethane is always relatively small with respect to the proportion of trichlorethylene chlorinated into pentachlorethane. The sole FIGURE of drawing is a diagram which provides a comparison, on a molar basis, of the relative percentages of trichlorethylene (abscissa) and dichlorethane (ordinate) transformed to their respective chlorination products. Thus 90 percent of the trichlorethylene is eliminated prior to the chlorination of 2 percent of the 1,2-dichlorethane.

The quantity of chlorine required depends on the degree of purification desired and on the respective proportions of trichlorethylene and 1,2-dichlorethane. On the basis of the diagram at least 90 mole percent of the trichlorethylene is eliminated (when the trichlorethylene concentration remains small, e.g., of the order of several percent) by employing 0.02 mole of chlorine per mole of 1,2-dichlorethane.

The concentration of trichlorethylene in 1,2-dichlorethane is in no way critical and can vary, for example, from 0.1 to 50 percent on a molar basis. The efficiency of the process is not related to the concentration of trichlorethylene.

The purification of dichlorethane by chlorine action, according to the invention, takes place over a large temperature range, e.g., between 0° and 100° C.; temperatures between 20° an 50° C., however, are preferred.

When a substantial production of 1,1,2-trichlorethane is desired, a fraction of 1,2-dichlorethane having a small trichlorethylene content may be chlorinated. Resulting 1,1,2-trichlorethane (b.p. 113.5° C.) may be separated from 1,2-dichlorethane by classical distillation.

In practice, treatment, according to the invention, of a fraction of 1,2-dichlorethane which is enriched in trichlorethylene is preferred. This is particularly advantageous for removing trichlorethylene from 1,2-dichlorethane which is carried along in light products leaving the first distillation of raw 1,2-dichlorethane. Such light products contain essentially incorporated 1,2-dichlorethane, ethylchloride, 1,1-dichlorethane, chloroform, carbontetrachloride, chloroprene and about 20 times more trichlorethylene than is found in the overflow of the still, by separating anew the products which are lighter than the 1,2-dichlorethane, one then obtains dichlorethane which can contain from 1 to 5 percent, and even more, trichlorethylene.

The overflow of the still is a liquid constituted, consequently, by 1,2-dichlorethane purified with respect to light compounds; this is the essential production of a first column for the purification of raw dichlorethane obtained primarily by oxichlorination of ethylene or as a nontransformed compound at the outlet of an oven for the pyrolysis of dichlorethane into vinyl chloride.

The invention is not limited to this particular embodiment or to the following examples, which are merely illustrative. The reactions were conducted at ambient temperature (25 C.) unless otherwise specified.

The quantity of chlorine required depends on the degree of purification desired and on the respective proportions of trichlorethylene and 1,2-dichlorooethane. On the basis of the diagram at least 90 mole percent of the trichlorethylene is eliminated (when the trichlorethylene concentration remains small, e.g., of the order of several percent) by employing 0.02 mole of chlorine per mole of 1,2-dichlorethane.

The concentration of trichlorethylene in 1,2-dichlorethane is in no way critical and can vary, for example, from 0.1 to 50 percent on a molar basis. The efficiency of the process is not related to the concentration of trichlorethylene.

The purification of dichlorethane by chlorine action, according to the invention, takes place over a large temperature range, e.g., between 0° and 100°C.; temperatures between 20° and 50°C., however, are preferred.

When a substantial production of 1,1,2-trichlorethane is desired, a fraction of 1,2-dichlorethane having a small trichlorethylene content maybe chlorinated. Resulting 1,1,2-trichlorethane (b.p. 113.5° C.) may be separated from 1,2-dichlorethane by classical distillation.

In practice, treatment, according to the invention, of a fraction of 1,2-dichlorethane which is enriched in trichlorethylene is preferred. This is particularly advantageous for removing trichlorethylene from 1,2-dichlorethane which is carried along in light products leaving the first distillation of raw 1,2-dichlorethane. said light products contain essentially incorportated 1,2-dichlorethane and around 20 times more trichlorethylene than is found in the overflow of the boiler of this column; by separating anew the products which are lighter than the 1,2-dichlorethane, one then obtains dichlorethane which can contain from 1 to 5 percent, and even more, trichlorethylene.

The invention is not limited to this particular embodiment or to the following examples, which are merely illustrative.

EXAMPLE 1

Comparative Tests with Known Techniques

Gaseous chlorine, dried by bubbling in sulfuric acid, is dissolved in 1,2-dichlorethane. After titration, this chlorine solution is mixed with a solution of trichlorethylene in the 1,2-dichlorethane. All of these operations are carried out in the absence of light and in a nitrogen atmosphere. At the end of the test, the organic phase is extracted by a cold solution of 2N NaOH, and the free chlorine is titrated by a KI-thiosulfate mixture. The total chlorine is titrated by mercurimetry, the active chlorine being preliminarily reduced by arseneous anhydride. The difference between the total chlorine and the active chlorine then permits a calculation of the quantity of HCl formed. The organic phase is dried by anhydrous sodium sulfate and analyzed by chromatography in the gaseous phase.

A. 1,2-dichlorethane containing of the order of 0.1 percent by weight trichlorethylene and around 60 milligrams of water per liter is treated in the manner described above while being protected from exposure to light. The operating conditions and the results obtained are recorded in table I.

Even for reaction periods of several days, no chlorination of the trichlorethylene in the 1,2-dichlorethane used is observed when the quantity of chlorine corresponds stoichiometrically to the quantity of trichlorethylene to be chlorinated. The addition of oxidized iron, although more reactive than metallic iron, has no effect.

B. Dichlorethane containing 0.1 percent of trichlorethylene and dried azeotropically is treated as described above in the presence of oxidized iron and ferric chloride (1 gram $FeCl_3$/Kg.) while being protected from exposure to light. The trichlorethylene is only chlorinated if exposed to a very high chlorine concentration (of the order of 3 percent molar with respect to $C_2H_4Cl_2$); at the end of 3 hours, only 50 percent is thus transformed.

EXAMPLE 2

According to the invention, chlorination in the presence of sunlight is effected in a manner otherwise similar to that of example 1 without any addition of iron. The results are reflected in table II.

Test no. 1 shows that, under these conditions, 45 percent of the trichlorethylene is eliminated in a reaction period of 30 minutes. Test 2 demonstrates that the presence of water is in no way unfavorable to the process according to the invention since 80 percent of the trichlorethylene present in 1,2-dichlorethane saturated with water is eliminated at the end of 30 minutes.

These two tests show in addition that other impurities present in the 1,2-dichlorethane are practically not attacked by the chlorine.

EXAMPLE 3

Through the irradiated annular space of a vertical glass tube reactor 15 liters per hour of 1,2-dichlorethane containing at the entry 0.1 percent by weight of trichlorethylene (representing a molar ratio of $C_2HCl_3/C_2H_4Cl_2$=0.00075) and 1.5 mole percent of chlorine (based on the 1,2-dichlorethane) are passed. AT the output of the reactor no chlorine is detected; the molar ratio $C_2HCl_3/C_2H_4Cl_2$ is 0.00011, representing a rate of elimination of 85 percent. The reactor is a vertical tube of glass (15 cm. in diameter and 15 cm. in height) within which is disposed a second coaxial tube having a diameter of 5 cm. and containing a Philips TIA/20 W05 lamp whose maximum emission is at 3,700 A. Under these lighting conditions, the purification with respect to $C_2HCl_3$ is accomplished in less than 10 minutes.

EXAMPLE 4

Fifteen liters/hour of 1,2-dichlorethane, saturated in water, and containing at the inlet trichlorethylene in a molar proportion of $C_2HCl_3/C_2H_4Cl_2$ equal to 0.08 and 1.70 mole percent of chlorine (based on the 1,2-dichlorethane) is passed through the reactor of example 3. At the outlet of the reactor chlorine is no longer detected; the molar ratio of $C_2HCl_3/C_2H_4Cl_2$ is 0.010 percent, representing a rate of elimination of 87 percent. Under the conditions of lighting the purification with respect to $C_2HCl_3$ is accomplished in less than 10 minutes.

It will be understood that the above description of the present invention is susceptible to various modifications, changes, and adaptations.

TABLE I

| Test | Temp. (C.) | Duration of test in hours | Catalyzer in percent by weight of $C_2H_4Cl_2$ | $Cl_2$, mole/L. Initial | $Cl_2$, mole/L. Final | $C_2HCl_3$, mole/L. Initial | $C_2HCl_3$, mole/L. Final | Molar of $C_2HCl_3$ transformed |
|---|---|---|---|---|---|---|---|---|
| 1a | 20–25 | 17 | None | 0.008 | 0.008 | 0.009 | 0.009 | 0 |
| 1b | 55 | 52 | ...do... | 0.008 | 0.008 | 0.008 | (1) | ... |
| 1c | 20–25 | 85 | 1% oxidized iron turnings. | 0.008 | 0.0045 | 0.008 | 0.008 | 0 |
| 1d | 20–25 | 85 | ...do... | 0.008 | 0.006 | 0.002 | 0.002 | 0 |

1 Not determined.

TABLE IIa

| | Test No. 1 | | | | Test No. 2 | | | |
|---|---|---|---|---|---|---|---|---|
| | Initial composition | | Final composition | | Initial composition | | Final composition | |
| | G./kg. | Moles/l. | G./kg. | Moles/l. | G./kg. | Moles/l. | G./kg. | Moles/l. |
| $CHCl_3$ | 2.38 | | 2.42 | | 1.45 | | 1.47 | |
| $C_6H_6$ | 3.12 | | 3.17 | | 1.13 | | 1.17 | |
| $CCl_4$ | 0 | | 0 | | | | | |
| $C_2HCl_3$ | 2.81 | 0.029 | 1.63 | 0.016 | 1.92 | 0.018 | 0.40 | 0.004 |
| $1,1,2\text{-}C_2H_3Cl_3$ | 0 | 0 | 2.77 | 0.027 | 3.10 | 0.030 | 15.9 | 0.156 |
| $C_6H_5Cl$ | 0 | | 0 | | 0 | | 0 | |
| $H_2O$ | 0 | | 0 | | Saturation | | Saturation | |
| $Cl_2$ | | 0.04 | | 0 | | 0.14 | | 0 |

TABLE IIb

| No. of test | Percent molar of conversion of— | | Duration of test, mins. |
|---|---|---|---|
| | $C_2HCl_3$ | $C_2H_4Cl_2$ | |
| Test 1 | 45 | 0.2 | 30 |
| Test 2 | 80 | 1.2 | 30 |

I claim:

1. In a process for selectively chlorinating trichloroethylene in an admixture of trichloroethylene with 1,2-dichloroethane, the improvement wherein the admixture in contact with chlorine is exposed to an amount and intensity of actinic light sufficient to effect substantial chlorination of trichlorethylene to pentachloroethane and virtually no chlorination of 1,2-dichloroethane.

2. A process for eliminating trichlorethylene from an admixture thereof with 1,2-dichlorethane which comprises chlorinating the trichlorethylene according to the method of claim 1.

3. A process according to claim 2 wherein the trichlorethylene is converted to pentachlorethane which is separated from the 1,2-dichlorethane.

4. A process according to claim 2 wherein the admixture of trichlorethylene with 1,2-dichlorethane is anhydrous.

5. A process according to claim 2 wherein the admixture of trichlorethylene with 1,2-dichlorethane contains water.

6. A process according to claim 2 wherein the chlorinating is effected at ambient temperature.

7. A process according to claim 2 wherein the trichlorethylene is converted to pentachlorethane, the pentachlorethane is separated from the 1,2-dichlorethane and the thus-prepared 1,2-dichlorethane is used in the production of vinyl chloride.

8. A process for the prevention of a reduction in the rate of conversion of trichlorethylene-contaminated 1,2-dichlorethane to vinyl chloride which comprises preliminarily treating the 1,2-dichlorethane according to the process of claim 2.

9. The use of actinic light according to claim 1 in separating trichlorethylene from 1,2-dichlorethane.

10. A process according to claim 1 wherein a mixture containing pentachloroethane and 1,1,2-trichloroethane is obtained by reaction between chlorine, and a mixture containing trichloroethylene and 1,2-dichloroethane.